United States Patent
Schultz

[15] 3,677,295
[45] July 18, 1972

[54] DIRECTIONAL VALVE CONTROL
[72] Inventor: John R. Schultz, Milwaukee, Wis.
[73] Assignee: Applied Power Industries, Inc., Milwaukee, Wis.
[22] Filed: Feb. 1, 1971
[21] Appl. No.: 111,276

[52] U.S. Cl............137/596.12, 137/625.21, 251/174
[51] Int. Cl............F16k 11/06
[58] Field of Search............137/596.12, 596.2, 596.13, 137/625.21, 625.46, 614.16, 614.17, 614.18, 614.2; 251/174, 172

[56] References Cited

UNITED STATES PATENTS

| | | | |
|---|---|---|---|
| 3,556,151 | 1/1971 | Masuda | 251/172 X |
| 2,696,219 | 12/1954 | Barksdale | 137/625.21 X |
| 2,881,802 | 4/1959 | Crawford | 137/625.23 |
| 2,036,237 | 4/1936 | Sibbe | 137/614.17 X |
| 2,362,945 | 11/1944 | Stephens | 137/596.12 |
| 2,852,040 | 9/1958 | Deardorff | 137/625.21 |

Primary Examiner—M. Cary Nelson
Assistant Examiner—Robert J. Miller
Attorney—James E. Nilles

[57] ABSTRACT

A directional control valve having a valve body with four ports equally spaced around a common axis, a wide land seal assembly in diametrically opposite ports and a movable valve disc mounted for rotary motion on one face of the valve body, the valve disc includes a pair of passages having openings positioned to engage the ports, check valves are provided in each of the passages to limit fluid flow to one direction through the passages, and a central passage for bypassing fluid through the valve body. The wide land seal assemblies each include a metal seal disc having a tapered flange on one side and a resilient sleeve bonded to the flange to seal the assembly in the port and to bias the metallic disc against the valve disc.

2 Claims, 8 Drawing Figures

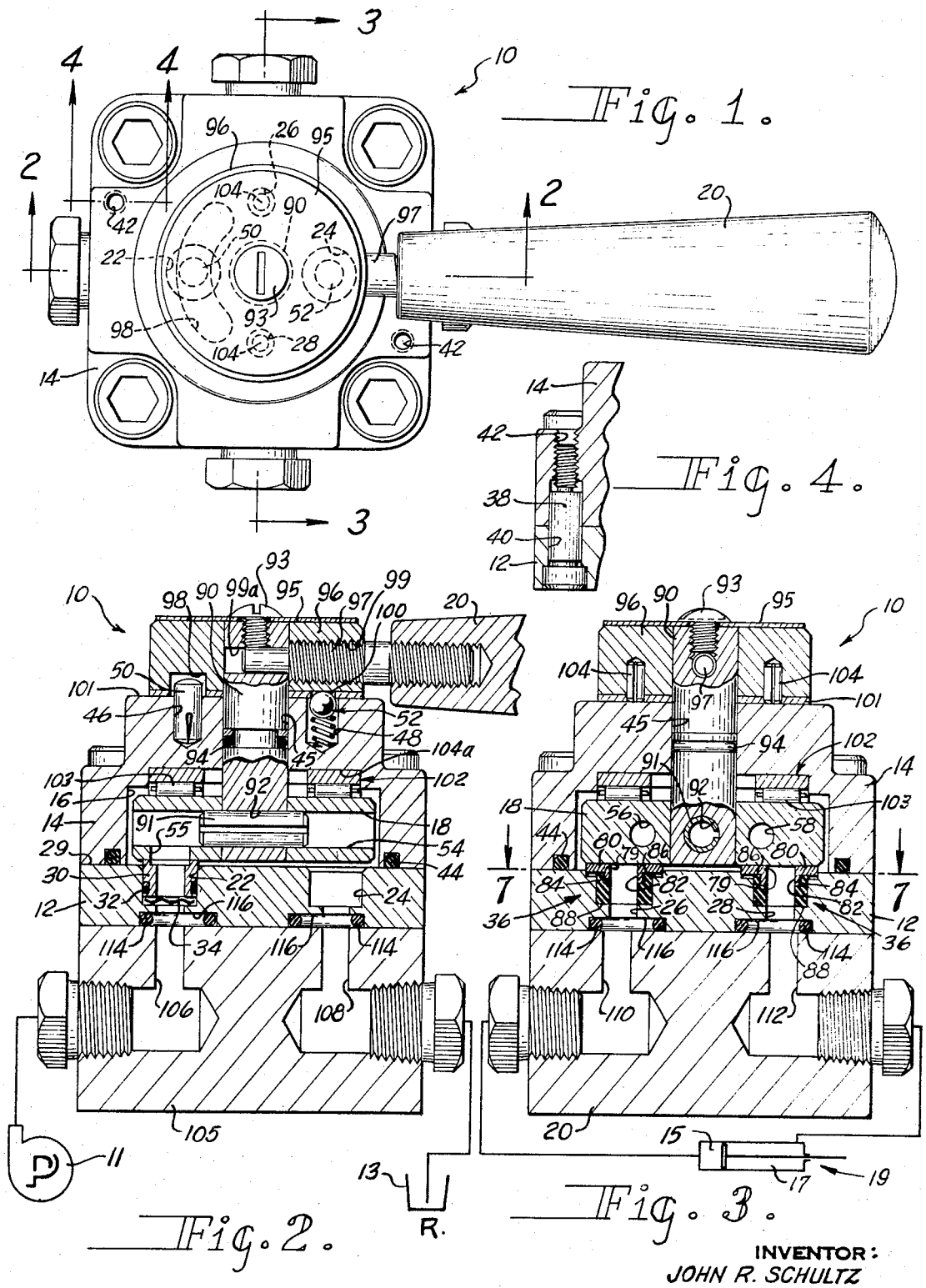

INVENTOR:
JOHN R. SCHULTZ
BY:
James E. Nilles
ATTORNEY

DIRECTIONAL VALVE CONTROL

BACKGROUND OF THE INVENTION

Valves of the type contemplated herein are generally used to control the flow of hydraulic fluid under a pressure up to 5,000 p.s.i. from a pump to both sides of a double acting cylinder or to a reservoir. Shear seals or wide land seals are commonly provided for sealingly engaging the surface of the movable disc and are provided with O-ring seals and springs to achieve the proper seals. On movement of the valve disc from one or the other of the fluid flow positions, a drop in pressure in the cylinder occurs due to the inability of the land seals to hold load pressure.

SUMMARY OF THE INVENTION

The control valve of the present invention provides positive pressure control at any position of the valve disc. The control valve includes a valve body having a number of ports therein with the diametrically oppositely disposed ports having wide land seal assemblies mounted therein. The valve disc is provided with a pair of flow passages having openings therein for selectively connecting the ports having the wide land seal assemblies to the other ports in the valve body. A check valve is provided in each of the pair of passages in the valve disc to prevent back flow of fluid from the cylinder when the valve disc is rotated. Constant pressure can be maintained in the cylinder even at pressures of 5,000 p.s.i. on movement of the valve disc.

Each of the wide land seal assemblies includes a flat metallic disc which has a resilient stem or sleeve bonded thereto to provide both a seal and spring bias for the metallic disc.

Other objects and advantages will become apparent from the following description when read in connection with the accompanying drawings.

THE DRAWINGS

FIG. 1 is a top view of the directional control valve of this invention;

FIG. 2 is a cross sectional view taken on line 2—2 of FIG. 1 showing the neutral position of the valve disc connecting the inlet port to the outlet port;

FIG. 3 is taken on line 3—3 of FIG. 2 showing the oppositely disposed wide land seal assemblies in the cylinder ports;

FIG. 4 is a detailed view taken on line 4—4 of FIG. 1 showing the connection of the bonnet to the valve body;

DESCRIPTION OF THE INVENTION

Figure 5:
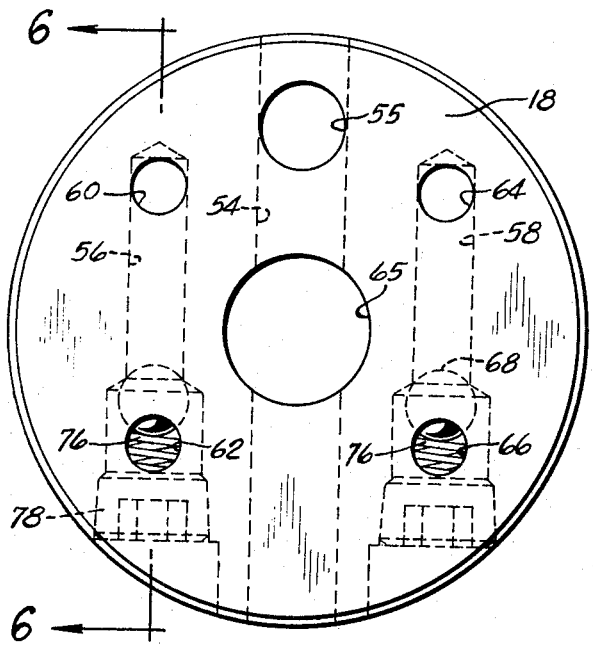
FIG. 5 is a bottom view of the valve disc showing the openings for the flow passages.

The control valve assembly 10 of the present invention generally includes a valve body 12 and a bonnet 14 having a recess 16 mounted on the valve body. A valve disc 18 is positioned within the recess 16 and is rotated by means of a handle 20 to control the direction of flow of hydraulic fluid through a number of ports provided in the valve body 12. A manifold 20 can be secured to the valve body 12 to provide for the connection of the valve body 12 to a pump 11, a reservoir 13, and to the two sides 15 and 17 of a double acting hydraulic cylinder or motor 19. The valve disc 18 is rotated from a neutral position either clockwise or counterclockwise to connect the pump 11 to either of the ends 15 or 17 of the cylinder 19.

CONTROL VALVE ASSEMBLY

More particularly, the valve body 12 includes an inlet port 22, an outlet or exhaust port 24, and motor or cylinder ports 26 and 28. Each of the ports 22, 24, 26 and 28 terminates on a common or seal surface 29 of the valve body. A shear seal 30 is provided in the inlet port 22 and is sealed therein by O-rings 32. A spring washer 34 is provided at the end of the shear seal 30 to bias the shear seal 30 into engagement with the valve disc 18. A wide land or shear seal assembly 36 is provided in each of the control ports 26 and 28, as more fully described hereinafter.

The bonnet 14 is secured to the valve body 12 by means of bolts 38 (FIG. 4) positioned in apertures 40 in the valve body 12 and extending into threaded opening 42 in the bonnet 14 to seal the bonnet to the valve body 12. The recess 16 completely encloses the ports 22, 24, 26 and 28. A pair of openings, or bores 46, 48 are provided in the upper portion of the bonnet 14. A stop pin 50 is provided in the bore 46 and a ball detent assembly 52 is provided in the bore 48. A central opening 45 is provided through the top of the bonnet.

Figure 6:
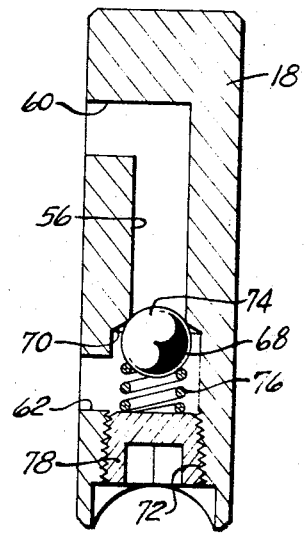
FIG. 6 is a view taken on line 6—6 of FIG. 5 showing a cross section of one of the cross connecting flow passages with a check valve at one end.

The valve disc 18, as seen in FIGS. 5 and 6, includes a central or neutral passage 54 which extends through the disc and has an opening 55 at one end. Control passage 56 and 58 are provided on each side of the passage 54 in a parallel relation thereto. The control passages are connected to the surface of the disc through openings 60, 62, 64, and 66. A central opening 65 is provided through the valve disc 18 transverse to the passage 54.

Means are provided to restrict the flow of fluid in one direction through each of the passages 56 and 58 in the form of check ball assemblies 68. In this regard, each of the passages 56 and 58 includes a valve seat 70 and a threaded opening 72. A ball 74 is positioned in the passage 56 in a position to engage the valve seat 70. The ball 74 is biased into engagement with the valve seat by means of a spring 76. A plug 78 is provided in the threaded aperture 72 to retain the spring 76 and ball 74 in the passage 56.

The valve disc 18 (FIG. 2 and 3) is rotated by means of the handle 20 which is secured to the valve disc 18 by means of a shaft 90. The shaft 90 extends through the opening 45 in the bonnet 14 through the aperture 65 in the valve disc 18. The shaft 90 is secured to the valve disc 16 by means of a spring pin 91 inserted into the central passage 54 of the valve disc and into an aperture 92 provided in the end of the shaft 90. The shaft 90 is sealed in the aperture 45 by means of an O-ring seal 94 provided in a groove 95 around the shaft 90. An annular disc 96 is secured to the upper end of the shaft 90 by a screw 93 and a plate 95. The handle 20 is secured to the annular disc 96 by means of a threaded pin 97 that extends through a threaded opening 99 in the disc 96 into an opening 99a in shaft 90.

The rotary motion of the valve disc 18 is limited by means of an arcuate groove 98 which is positioned to engage the pin 50 in the bonnet 14. The groove 98 has a length sufficient to positively locate the openings 60, 62 and 64, 66 with the ports 22, 26 and 24, 28 or 22, 28 and 24, 26.

Means are provided between the disc 96 and the bonnet 14 to positively locate the valve disc 18 in the neutral position in the form of a detent plate 101 having an opening or aperture 100 positioned to engage the ball detent assembly 52. The plate 101 is secured to the disc 96 by means of pins 104. The plate 101 is also provided with a groove 102 which corresponds to the groove 98 in the disc 96. On movement of the plate 101 to a position where the opening 100 is in alignment with the bore 48, in the bonnet 14, the detent ball assembly 52 will snap into engagement with the opening 100 indicating that the handle is in the neutral position.

Means are provided within the recess 16 to minimize wear between the disc 18 and the bonnet 14. Such means is in the form of a thrust bearing 102 positioned within an annular recess 104a provided at the top of the recess 16 and having roller bearings 103 positioned to ride on the upper surface of the valve disc 18.

Figure 7:
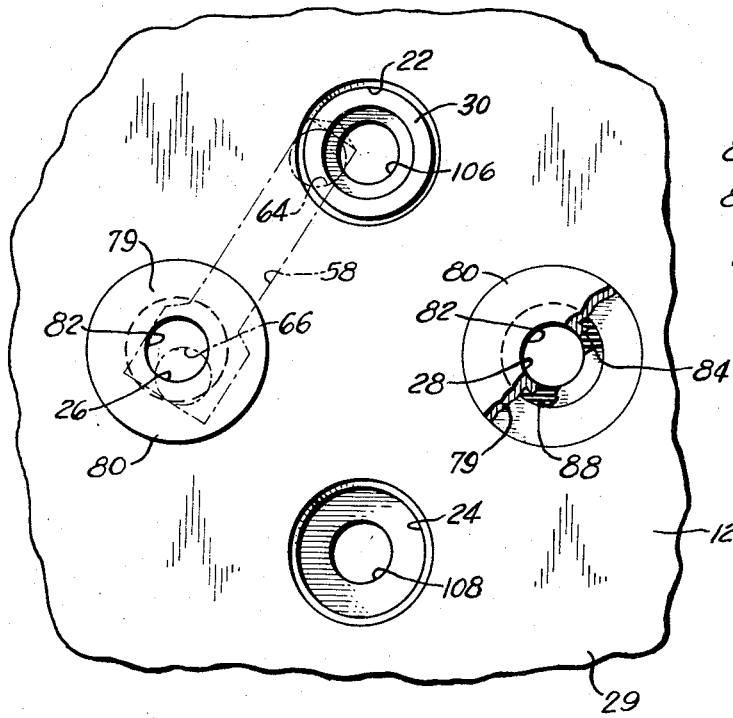
FIG. 7 is an enlarged view of a portion of the valve body showing the location of the ports with one of the land seal assemblies partially broken away, taken on line 7—7 of FIG. 3 with the passage 58 shown in phantom lines.
Figure 8:
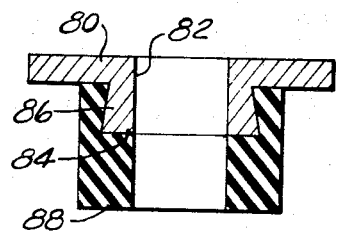
FIG. 8 is an enlarged view in section of one of the land seal assemblies.

LAND SEAL ASSEMBLIES (FIGS. 3 and 7)

The seal assemblies 36 include a flat highly finished hardened steel disc or plate 79 having a wide circular seal surface 80 and a central aperture or opening 82. A cylindrical tapered flange 84 is provided on the opposite surface of the pate 79 and has an inwardly angled outer surface 86. The plate 79 is sealed in the ports 24 and 26 by means of a resilient sleeve 88 bonded or molded to the cylindrical flange 84 and retained thereon by means of the angled surface 86. The resilient sleeve 88 can be formed of a resilient material such as Buna N rubber or a polyurethane. The latter being preferred. The sleeve or stem 88 is slightly larger than the opening in the ports 26 and 28 to provide a seal on insertion therein. The sleeve is also made of sufficient length to bias the plate 79 against the under surface of the valve disc 18.

The directional control valve can be used to control the flow of fluid to any device where positive high pressure shut-off is required. In this embodiment of the invention, a manifold 105 is shown mounted on the valve body 12 and has an inlet opening 106 in alignment with the inlet port 22, an outlet opening 108 in alignment with the outlet port 24 and control passages 110 and 112 on diametrically opposite sides of the manifold in alignment with the cylinder ports 26 and 28. O-ring seals 114 are provided in depressions 116 in the surface of the valve body 12 to seal the ports in the valve body to the passages in the manifold.

OPERATION

In operation, the valve disc 18 is normally located in a neutral position by means of the detent ball assembly 52 which engages the opening 100 in the detent disc 101. The opening 55 in the central passage 54 of the valve disc 18 will be in alignment with the inlet port 22 in the valve body 12. Fluid from the pump 11 will enter the inlet passage 106 in the manifold and pass through the inlet port 22 through the opening 55 into the central passage 54. The fluid flows through the passage 54 into the recess 16 in the bonnet and will be discharged through the outlet port 24 and the outlet passage 108 in the manifold to the reservoir 13.

When the valve disc 18 is rotated counterclockwise in FIG. 1 to a position where the pin 50 engages the end of the arcuate groove 98, the openings 64 and 66 in the passage 58 will be aligned with the inlet port 22 and the cylinder port 28 and the openings 60 and 62 in the passage 56 will be aligned with the cylinder port 26 and the outlet port 24. High pressure fluid from the pump 11 will enter the opening 100 and pass through the port 22 into the passage 58 in the valve disc 18. The pressure of the fluid will open the check valve 68 at the end of the passage 58 allowing fluid to flow through the cylinder port 28 into the passage 112 and into one side of the motor 19. Fluid from the other side 15 of the motor 19 will be forced into the passage 110 through port 26 and into the valve disc passage 56. The pressure of the fluid will open the check valve 68 at the end of the passage 56, allowing the fluid to flow to the reservoir 13.

When the valve disc 18 is rotated counterclockwise, to a position where the stop pin 50 engages the other end of the arcuate opening 98, the openings 60 and 62 in passage 56 will be aligned with the inlet port 22 and the cylinder port 26. The openings 64 and 66 in passage 58 will be aligned with the outlet passage 24 and the cylinder port 28. Hydraulic fluid entering the port 22 will flow through the passage 56 opening the check valve assembly 68 at the end of the passage 56, the cylinder port 26, the passage 110 and into one side 15 of motor 19. Fluid from the motor 19 will pass through the passage 110, port 28, passage 58 in the valve disc opening the check valve assembly 68 at the end of the passage 58 and through outlet port 24 to reservoir 13.

The pressure of the hydraulic fluid in the motor 19 is maintained constant on movement of the valve disc back to the neutral position by means of the check valve assemblies 68. In this regard, it should be noted that both check valve assemblies are located at the same end of the passages 56 and 58. On movement of either of the openings 60 or 64 from the inlet port 22, the ports 60 or 64 will momentarily bridge the shear seal 30 (shown clearly in FIG. 7) while the corresponding ports 62 and 66 will still be in communication with the corresponding cylinder ports 26 or 28. The pressure of the fluid in the passages 56 or 58 will drop due to opening of the openings 60 or 64 to the recess 16. The check ball assemblies 68 close immediately on a drop of pressure in the passage 56 or 58 preventing any loss in pressure in the cylinder 19.

We claim:

1. A directional control valve including a valve body having a number of ports terminating on a common surface, a wide land seal assembly in at least one of said ports projecting above said surface, a bonnet sealingly mounted on said common surface of said valve body and including a recess, a valve disc mounted for rotary motion in said recess and including a first passage having an opening at each end, means in said passage for limiting the flow of fluid to one direction through said passage, means for rotating said valve disc to selectively connect one of the openings in said passage to the port having the wide land seal assembly and the other of said opening to another of the ports in said valve body, a second wide land seal assembly in said another of the ports and projecting above said surface, a second passage in said valve disc having openings at each end, means in said second passage for limiting the flow of fluid to one direction through said second passage, one of said openings in said second passage being connected to the port having the second wide land seal assembly when the first passage is aligned with the port having the first wide land seal assembly, each of said seal assemblies including a metallic disc having a central opening and a tapered cylindrical flange around said opening and resilient means bonded to said flange to sealingly engage said port and to bias said metallic disc into engagement with said valve disc.

2. A directional control valve for controlling the flow of high pressure hydraulic fluid from a source of high pressure fluid to a hydraulic double acting device or to a reservoir, the valve comprising, a valve body having an inlet port connected to said source, an outlet port connected to said reservoir, and first and second connecting ports connected to said device, a wide land seal assembly in each of said first and second ports, a bonnet sealingly mounted on said body and having a recess therein enclosing said ports, and a valve disc mounted for rotary motion within said recess, said valve disc having a neutral passage extending through the axis of said disc and first and second passages on each side of said neutral passage, said first and second passages each having openings therein, means within each of said passages for limiting fluid flow to one direction through said passages, and means for rotating said valve disc to selectively connect said inlet port to an opening in one of said passages and said outlet port to one of the openings in the other of said passages, the other opening in each of said passages being connected to one of said first and second ports, each of said wide land seal assemblies including a metallic disc having a central opening and a depending flange around said opening and a resilient sleeve bonded to said flange to sealingly engage said port and to bias said metal disc toward said valve disc.

* * * * *